W. N. KING.
HYDRANT SHUT-OFF.
APPLICATION FILED OCT. 8, 1918.

1,327,283.

Patented Jan. 6, 1920.

Witnesses
L. N. Gillis
H. M. Test

Inventor
W. N. King,
By Chandler & Chandler
Attorneys

UNITED STATES PATENT OFFICE.

WALTER N. KING, OF COLORADO SPRINGS, COLORADO.

HYDRANT SHUT-OFF.

1,327,283. Specification of Letters Patent. Patented Jan. 6, 1920.

Application filed October 8, 1918. Serial No. 257,342.

*To all whom it may concern:*

Be it known that I, WALTER N. KING, a citizen of the United States, residing at Colorado Springs, in the county of El Paso, State of Colorado, have invented certain new and useful Improvements in Hydrant Shut-Offs; and I do hereby declare the following to be a full, clear, and exact description of the invention, such as will enable others skilled in the art to which it appertains to make and use the same.

This invention relates to new and useful improvements in stock watering tanks and particularly to means for controlling the supply of water thereto.

One object of the present invention is to provide a novel and improved means for automatically cutting off the supply of water when the tank is filled.

Another object is to provide a novel and improved device of this character which is capable of operation by means of a float or by the action of the overflow of water of the tank.

Other objects and advantages will be apparent from the following description when taken in connection with the accompanying drawing.

Figures 1, 2:
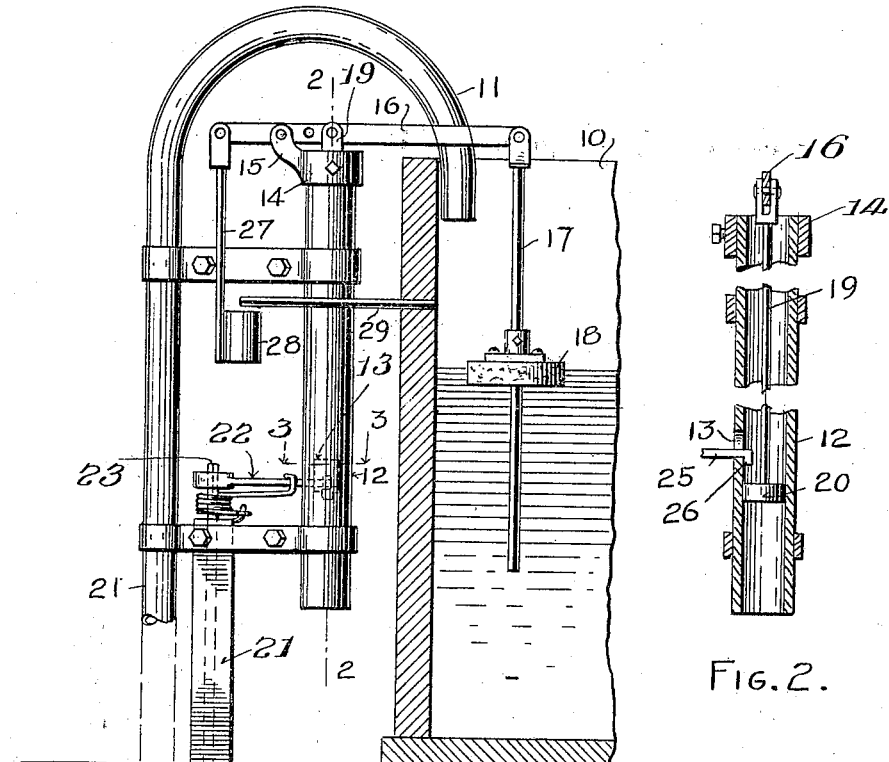
Figure 1 is an elevation of the device in position on the tank, the tank being shown in fragmentary section.
Fig. 2 is a vertical sectional view taken on the line 2—2 of Fig. 1.
Figures 3, 4:
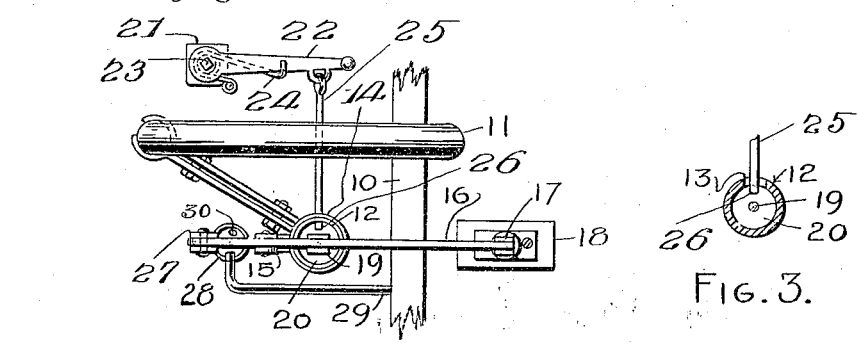
Fig. 3 is a horizontal sectional view taken on the line 3—3 of Fig. 1.
Fig. 4 is a top plan view of the device.

Referring particularly to the accompanying drawing, 10 represents a portion of a stock watering tank in connection with which my invention is used. The supply pipe is shown at 11, and has its upper end turned downwardly over the tank to properly discharge water into the tank. A pair of clamping brackets are secured to this pipe, and supported in the other ends of the said clamps is a vertical hollow standard 12 having an opening 13 in one side thereof for a purpose which will presently appear. Mounted on the top of the standard is a cap member 14 having a vertical pair of lugs 15 between which is disposed, and on which is pivotally mounted a rocking beam 16. Pivotally suspended from one end of the beam is a link 17 and adjustably carried by the lower end of the link is a float 18, the same being disposed within the tank and arranged to rise and fall with the water therein. Pivotally connected to the beam, at a point adjacent the other side of the pivotal mounting of said beam, is a downwardly extending rod 19, the same being disposed within the hollow standard and having a head 20 on its lower end which is adapted to move vertically across the said opening 13. Connected to the pipe 11 is a hydrant 21 having the valve handle 22 extending at right angles from the outer end of the stem 23 of the valve. A coil spring 24 is engaged around the said stem and has one end secured to the said handle and its other end secured in a stationary manner to the lower bracket 10, said spring being so arranged and secured that it normally holds the valve in closed position. Loosely connected to the outer end of the said handle is an arm 25 having a hook 26 formed on the outer end for engagement with the lower wall of the opening 13. When the hook is thus engaged in the opening, the spring will be under tension and the valve held in open position so that water will flow upwardly through the pipe 11 and into the tank. As the water rises in the tank the float will rise thereby and cause the rocking of the beam with the result that the rod 19 will be lifted and the head 20 moved upwardly across the opening 13, with the result that the hook will be lifted out of engagement with the wall of the opening and the valve be permitted to close under the influence of the spring. Thus when the hook has been properly engaged in the opening 13, the valve of the hydrant will be in open position so that water will flow into the tank, but as soon as the water level rises to the proper degree, the hook will be released and the valve be permitted to close, shutting off the water and preventing overflow of the tank.

Pivotally suspended from the other end of the beam is a link 27 having a cup 28 on the lower end for receiving the overflow of water from the tank which passes out through the pipe 29. Thus, should the float fail to operate by reason of the sticking of the pivot of the beam, the weight of the water which flows into the cup will cause the proper rocking of the beam and the release of the hook of the valve handle.

There is thus provided a novel and efficient device for filling a stock watering tank whereby when the tank is properly filled the water will be automatically cut off to prevent the overflowing of the tank. Also, means are provided whereby should the first means fail to properly operate, the overflow of water will not take place from the upper edge of the tank, but through the overflow pipe.

If desired either the float or the cup may be used alone, or both in conjunction, as shown in the drawing.

The bottom of the cup 28 is formed with a small opening 30 which insures the complete emptying of the same, thereby preventing freezing of the water in the cup in cold weather.

What is claimed is:

A water controlling supply device for a water tank including a supply pipe having a spring closed valve, a hollow standard supported by the pipe and having an opening in one side, a hook member carried by the stem of the valve and arranged to be engaged in the said opening to hold the valve open, a rocking member carried by the supporting standard, a float on one end of the member and suspended within the tank, and a water receiving receptacle suspended on the other end of the rocking member for receiving overflow water from the side of the tank.

In testimony whereof, I affix my signature, in the presence of two witnesses.

WALTER N. KING.

Witnesses:
J. F. SANFORD,
JOHN S. KING.